Figure 1:
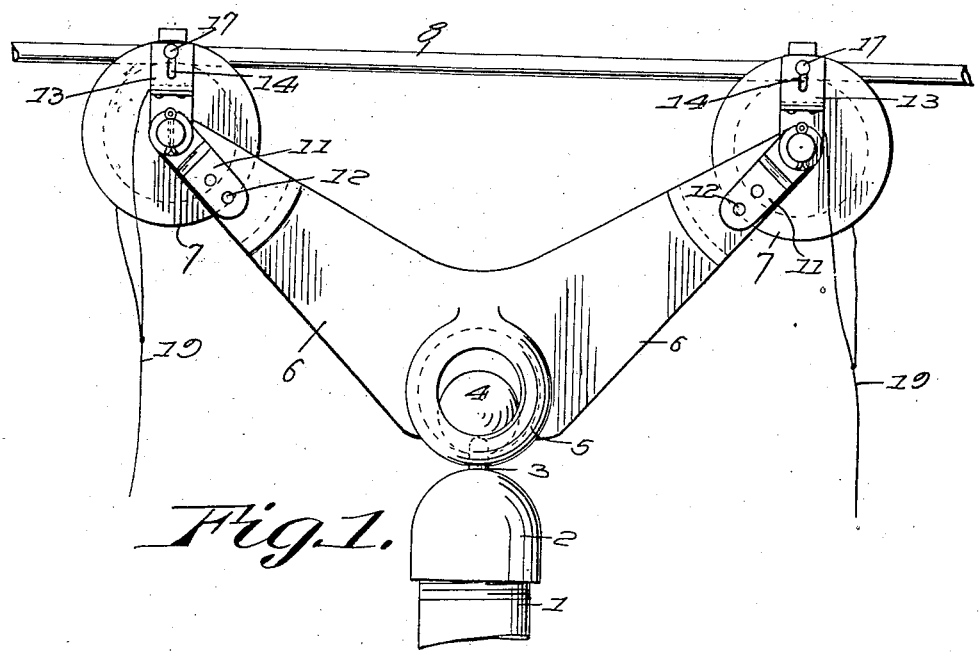

J. PIVARNIK.
TROLLEY.
APPLICATION FILED AUG. 21, 1920.

1,363,995.

Patented Dec. 28, 1920.

Inventor
Joseph Pivarnik
By Wm. C. Linton
Attorney

UNITED STATES PATENT OFFICE.

JOSEPH PIVARNIK, OF McADOO, PENNSYLVANIA.

TROLLEY.

1,363,995.  Specification of Letters Patent.  Patented Dec. 28, 1920.

Application filed August 21, 1920. Serial No. 405,000.

*To all whom it may concern:*

Be it known that I, JOSEPH PIVARNIK, a citizen of the United States, and a resident of McAdoo, county of Schuylkill, State of Pennsylvania, have invented certain new and useful Improvements in Trolleys; and I do hereby declare that the following is a full, clear, and exact description of the invention, such as will enable others skilled in the art to which it appertains to make and use the same.

This invention relates to improvements in guards adaptable for use in connection with the trolleys of electrical railway vehicles, that is, electrically propelled vehicles which traverse a predetermined course, and it is an object of the invention to provide a guard which can be readily attached to the conventional form of trolley, serving as effectual means for preventing undesired disengagement or the "jumping" of the trolley from the overhead feed wire of the usual overhead system, irrespective of the movement of the said wheel with relation to the wire or its movement over frogs, hangers, etc., arranged on the trolley wire or the movement thereof about curves and other irregularities of the wire.

It is also an object of the invention to provide a guard of the character mentioned which is so constructed as to permit its ready engagement with and disengagement from the overhead trolley wire.

Among other aims and objects of the invention may be recited, the provision of a trolley guard with a view to compactness, and in which the numbers of parts are few, the construction simple, the cost of production small, and also, a device which will effectually function for the purpose for which it is designed.

In order that the invention and its mode of operation may be readily understood by workers skilled in the art, I have in the accompanying illustrative drawings, and in the detailed following description based thereon, set out a practical embodiment of the same.

Figures 2, 3, 4:
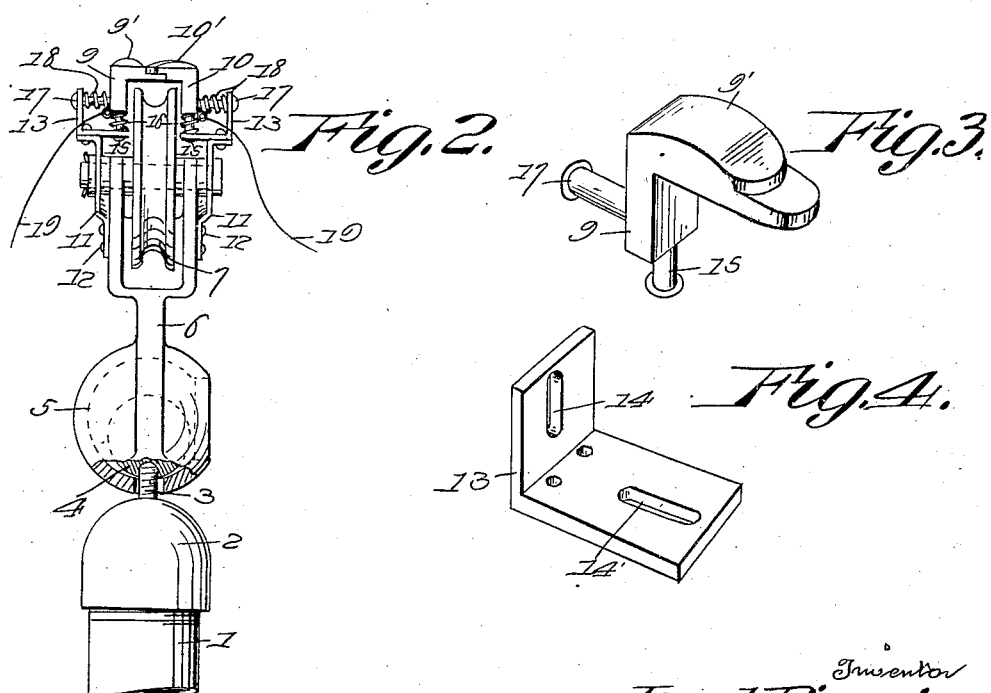

In the drawings:

Figure 1 is a side elevation of a trolley carriage and wheels carried thereby having the guard embodying the present invention applied thereto; Fig. 2 is an end elevation of the same; Fig. 3 is a detailed perspective view of one of the guard members; and Fig. 4 is a detailed perspective view of one of the angle brackets.

Having more particular reference to the drawings, in which like characters will designate corresponding parts throughout: 1 represents a fragment of the ordinary trolley pole employed in connection with the electrically controlled vehicles receiving their energy from an overhead source, the upper end of which is screw-threaded for engagement with the correspondingly threaded portion of a ferrule 2, carrying on its upper end a vertical screw-threaded stud 3, engaging a spherical element or ball 4, which is loosely received in the socket 5, of ordinary ball and socket design, this socket being carried on the lower end of a Y-shaped trolley wheel carriage 6, having peripherally grooved trolley wheels 7 rotatably mounted in suitable bearings formed in the bifurcated outer ends of the several arms thereof. As will be understood, these trolley wheels 7 are adapted to be engaged with and moved from the trolley wire 8, whereby proper contact with the source of energy for propelling the electric vehicle carrying the trolley pole 1 will be effected.

My improved guard may be stated to comprehend opposed angle arms 9 and 10 having curved deflecting portions 9' and 10' formed on the upper or exposed surfaces thereof, while the adjacent ends of such arms are reduced to permit of overlapping engagement as between the same, the purposes of which will be hereinafter apparent.

To support these opposed angle arms which constitute the guards proper, bracket arms 11 are secured as at 12 to the opposite sides of the bifurcated portions of the trolley-carriage arms, and each bracket arm has connected to its angularly disposed upper end an angle bracket 13, the vertical sides of which are slotted as at 14. Headed pins 15 are slidably engaged with the inner ends of the angle arms 13 and are carried by the lower ends of the guards 9 and 10, while coil springs 16 are arranged about the several pins and their opposite ends bear upon the adjacent portions of the guard arms and bracket arms whereby said guard arms will be yieldably maintained in their uppermost positions with respect to the peripherally grooved trolley wheels 7, over which they are engaged. To normally maintain the guard arms 9 and 10 in their closed or contacting position, other headed pins 17 are slidably arranged in the slots 14 in the upper portions of the vertical sides of the angle brackets 13 and are connected to the adjacent portions of their respective guard arms 9 and 10, coil springs 18 being arranged thereabout, and obviously, serving as means for placing said arms under the necessary tension in order that the same will normally remain in their closed or contacting relationship. In this connection, it may be noted that when the guard arms 9 and 10 are in closed position, the reduced adjacent ends thereof will be arranged in an overlapping fashion and in consequence, will provide an effectual bridge or closure. This bridge or closure formed by the guard arms extends over the trolley wire 8 when the trolley wheels are in the position as shown in Fig. 1 and will prevent the trolley wheels from jumping or otherwise becoming disengaged from the trolley wire.

To facilitate the moving of the guard arms 9 and 10 to open position in order that the trolley wheels provided therewith may be disengaged from the trolley wire 8 or engaged with such wire, as the case may be, suitable connections 19 are engaged with the outer portions of said arms and are of lengths sufficient to permit engagement therewith by the car operator or attendant.

In using my improved guard, to engage the trolley wheels 7 with the trolley wire 8, it is only necessary to permit the trolley pole 1 to swing upwardly to a point in proximity to such trolley wire and to arrange said wire between the curved deflecting elements 9' and 10' arranged on the upper side of the guard arms 9 and 10. With the trolley wire in this position pull should be exerted upon the several connections 19, thus causing the guard arms 9 and 10 to be moved apart and provide a gap therebetween sufficient to permit engagement of the wire with the grooved peripheral surfaces of the trolley wheels 7. With this connection effected, the connections 19 are released, whereupon the guard arms will immediately return to their closed positions under influence of the coil springs 18, thus producing an effectual means for preventing accidental or undue disengagement of the trolley wire 8 from the peripherally grooved surfaces of the trolley wheels 7, since, as will be noted, these guard arms by reason of their angular formation are arranged about and in spaced relation to the peripheral portions of the several trolley wheels.

Due to the engagement of my improved guards with the trolley wire 8, the trolley wheels 7 provided therewith will be prevented from "jumping" said trolley wire, which is often caused by the abrupt contact of the wheels with the so-called frogs, hangers and other means employed for supporting and connecting trolley wires.

Further, any attempts at lateral disengagement of the wheels from the trolley wire such as might be caused by the abrupt engagement with the same with curves or other irregularities existing in the wires, will be prevented. Furthermore, by reason of the ball and socket connection with the trolley wheel carriage 6 and the trolley pole 1, it will be understood that movement as between these two elements will be permitted and in consequence, such movement between the same will compensate for any material movement of the trolley pole with relation to the trolley wire 8 and in consequence, will tend to relieve any tendency of the "jumping" of the trolley wheels such as is often caused by such shifting of the trolley pole 1 with relation to the wire 8.

Instead of employing a Y-shaped carriage such as I have herein shown and described with some detail, it is to be appreciated that I may equally well employ my improved guard in connection with the conventional type of single wheel trolley pole, or in fact, with any form of trolley pole or wheel now prevalent in the art.

Manifestly, the construction shown is capable of considerable modification, and such modification as is within the scope of my claims I consider within the spirit of my invention.

I claim:

1. A trolley guard, comprising a pair of oppositely disposed angle brackets, vertically disposed headed pins engaged with the inner ends of said angle brackets, opposed angle arms engaged by said pins, and having their free portions arranged about and in spaced relation to the grooved peripheral surface of the trolley wheel, spring means carried by the angle brackets and bearing upon adjacent portions of said angle arms for normally maintaining the same in closed positions, curved deflecting elements formed upon the upper sides of said angle arms, and means connected to the angle arms for facilitating movement of the same to open position, at times.

2. A trolley guard of the character described comprising a support, angle brackets secured to said support, said brackets having elongated slots therein, angular guard members, headed pins formed with the depending arms of each guard member and adapted to extend through the slots of said angular brackets, coil springs encircling said pins and arranged between said guard members and said brackets, the adjacent ends of said guard members being provided with cut-away portions and adapted to overlap one another, and the upper faces of each guard member being provided with a curved deflecting portion substantially as and for the purpose specified.

In witness whereof I have hereunto set my hand.

JOSEPH PIVARNIK.